C. B. GAMBLE.
MECHANISM FOR RECORDING THE LOAD, MILEAGE, AND SPEED OF VEHICLES.
APPLICATION FILED JUNE 28, 1917.

1,261,508.

Patented Apr. 2, 1918.
2 SHEETS—SHEET 1.

WITNESSES:
B. Hall
G. E. Sorensen

INVENTOR:
CHARLES B. GAMBLE
BY
Paul & Paul
ATTORNEYS

C. B. GAMBLE.
MECHANISM FOR RECORDING THE LOAD, MILEAGE, AND SPEED OF VEHICLES.
APPLICATION FILED JUNE 28, 1917.
1,261,508.
Patented Apr. 2, 1918.
2 SHEETS—SHEET 2.
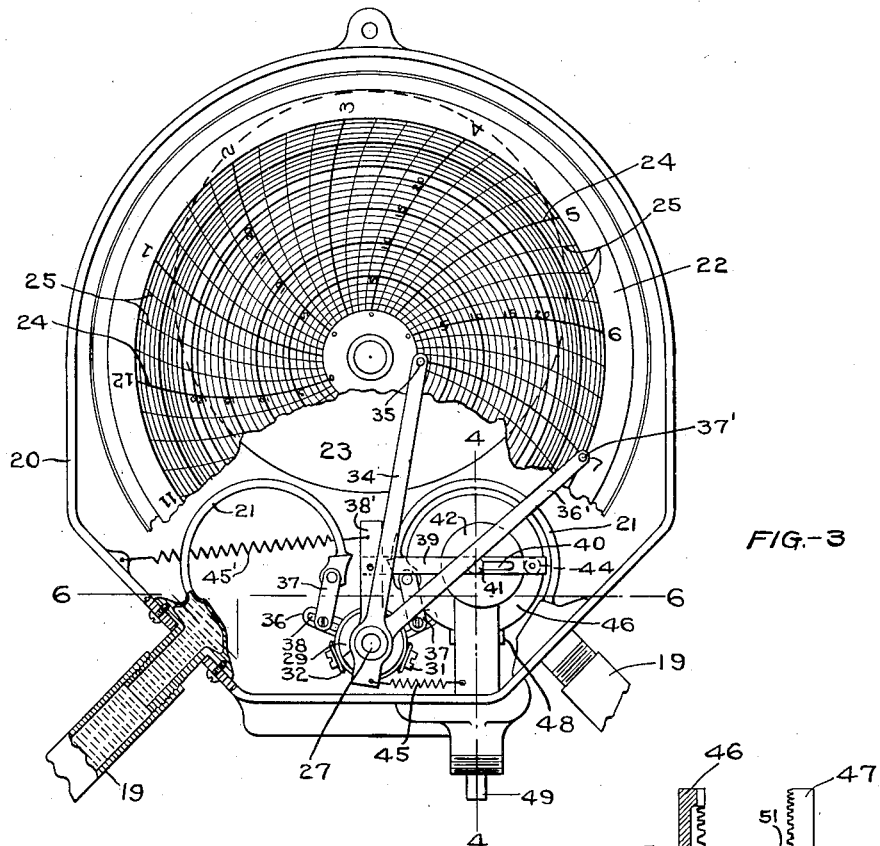
FIG.-3
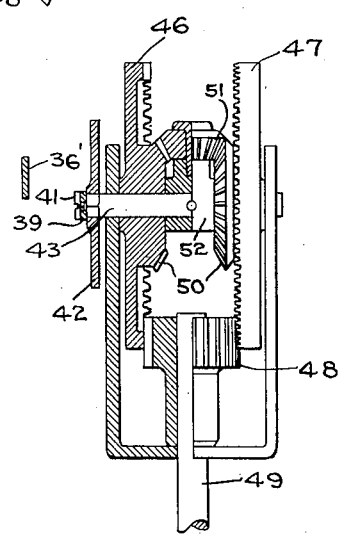
FIG.-4
FIG.-5
WITNESSES:
B. Hall
G. E. Sorensen
INVENTOR:
CHARLES B. GAMBLE.
BY
ATTORNEYS.

UNITED STATES PATENT OFFICE.

CHARLES B. GAMBLE, OF MINNEAPOLIS, MINNESOTA.

MECHANISM FOR RECORDING THE LOAD, MILEAGE, AND SPEED OF VEHICLES.

1,261,508.  Specification of Letters Patent.  Patented Apr. 2, 1918.

Application filed June 28, 1917. Serial No. 177,486.

*To all whom it may concern:*

Be it known that I, CHARLES B. GAMBLE, a citizen of the United States, resident of Minneapolis, county of Hennepin, State of Minnesota, have invented certain new and useful Improvements in Mechanism for Recording the Load, Mileage, and Speed of Vehicles, of which the following is a specification.

My invention, while applicable to any type of vehicle, is particularly designed for trucks for making a permanent record of each day's use of the truck, showing the load on the vehicle at any time, the mileage made with any load, the time the vehicle is moving and the time standing still, the speed at any point in its travel, the roughness of the road, which, by comparison with the speed, will disclose the character of the driving, the running of the motor when the vehicle is standing still, the number of stops made to discharge the load or for other causes, and the time of each stop, the object being to obtain an absolute check on the operator of the vehicle by means of which any abuse of the truck or reckless driving or waste of time can be detected and corrected.

The invention consists generally in various constructions and combinations, all as hereinafter described and particularly pointed out in the claims.

Figure 1:
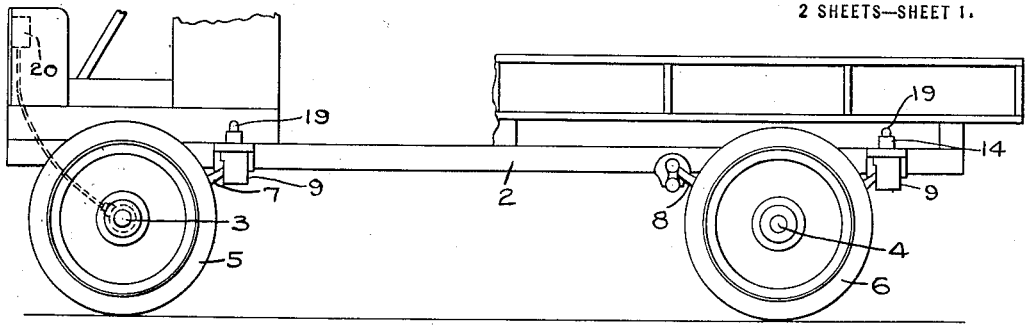

In the accompanying drawings forming part of this specification,

Figure 1 is a side elevation of a truck of ordinary construction, with my invention applied thereto.

Figure 2:
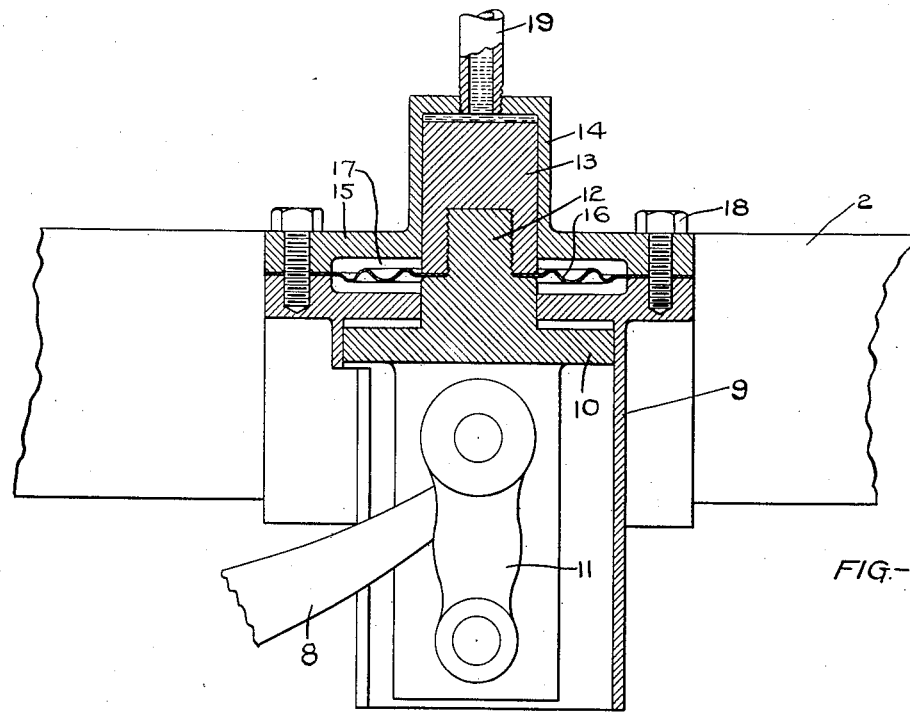
Figure 6:
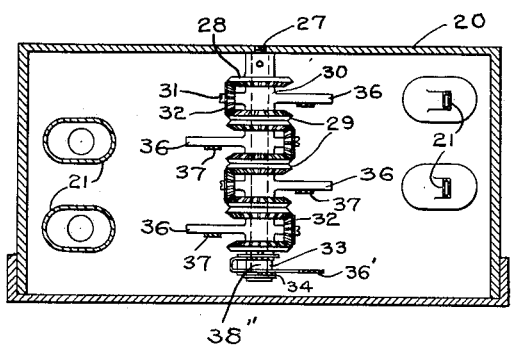

Fig. 2 is a detail sectional view of a portion of a truck frame, showing the preferred manner of attaching the operating mechanism of the device to the springs, Fig. 3 is a detail view, partially in section, showing the means for operating the dial markers, Fig. 4 is a detail sectional view on the line 4—4 of Fig. 3, Fig. 5 is a detail view, showing a section of the paper dial or sheet on which the daily record is made, Fig. 6 is a sectional view on the line 6—6 of Fig. 3.

In the drawing, 2 represents a truck frame having forward and rear axles 3 and 4, carrying wheels 5 and 6, and springs 7 and 8. This truck is of ordinary power-driven type and the frame and running gears are of ordinary construction, I have shown my invention applied to a truck of this kind merely as an illustration of the way the invention may be applied to a vehicle, but do not confine myself to such application, as it is capable of being mounted in other ways and on vehicles of various types. The preferred manner of application I will now proceed to describe in detail.

At each corner of the truck frame I mount a cylinder 9 having a plunger 10 therein connected by links 11 with one end of the adjacent spring 8, which I have shown of the semi-elliptic shape. The plunger is provided with a stud 12 and the piston 13 is mounted on said stud and slidable within a cylindrical part 14 formed on a cap 15. A diaphragm 16 is interposed between said cap and the top of the cylinder 9 and its middle portion is gripped between the stud 12 and the piston 13 within a recess 17 formed between the cap 15 and the top of the diaphragm 16. The cap 15 is preferably secured in place by bolts 18. The pipe 19 leads from the cylinder 14 and is connected to a casing 20, there being one pipe from each of the cylinders 14 at the corners of the truck, or four in all.

Mounted on the inner wall of the casing 20 and communicating respectively with the pipes 19 are a series of curved hollow tubes 21, generally known as Bourdon coils, and these coils and the pipes and the cylinders 14 are filled with an inelastic fluid, such as oil, by which the movement of the pistons 13 will be transmitted to the coils 21 and from thence to the hand operating mechanism of the dial. The dial or record sheet, which I will designate by reference numeral 22, is of the well-known type, similar to those used in such instruments as self-registering thermometers, the sheet being mounted to revolve through the operation of a time piece 23 mounted within the casing in the rear of the recording sheet, and being of ordinary construction and well-known for purposes of this kind, I will not attempt to explain it in detail herein, it being sufficient to state that the sheet is mounted to make a complete revolution in twelve hours and is divided by a series of curved radial lines into spaces representing hours and fractions thereof. These lines I will indicate by numerals 24 for the even hours and 25 for the fractional parts thereof. For convenience of computation, I have divided the hours into spaces of fifteen minutes each, though any other division may be made, if preferred. The sheet also has a series of concentric circles thereon, each representing so many pounds in weight, and for convenience I have marked the figures representing the pounds on the radial lines. Thus starting with zero at the inner circle and running outwardly toward the periphery, I divide the space by the concentric circles into hundreds of pounds, marking the dial, as shown in Fig. 5, with numerals indicating 500, 1000, 1500 and 2000 pounds, so that, at a glance, the inspector of the record sheet can instantly determine the load on the truck at any given time.

For making this record on the dial sheet I provide in the case 20 a shaft 27, as shown in Fig. 6. A beveled gear 28 is secured on one end of the shaft 27 and a series of double-faced bevel gears 29 are loosely mounted on the shaft 27 and are separated from each other and the gear 28 by hubs 30. Each hub is provided with a radially projecting stud 31 on which a beveled pinion 32 is mounted, one pinion meshing with the gear 28 and with the adjacent gear 29 and the next pinion meshing with two adjacent gears 29 and so on to the other end of the shaft, where the last gear 29 is provided with hub 33 on which a stylus or marking hand 34 is mounted and projects across the paper dial sheet and is provided with a marking pencil or stylus 35 for making a permanent record on the face of the sheet.

The hubs 30 are also provided with arms 36 and there are as many of these hubs and arms as there are of the coils 21, and said arms are connected respectively by links 37 with the adjacent coils, each arm preferably having a slot 38 therein for the adjustment of the links to vary the travel or stroke of the arms proportionately to the movement of the coils. This marker or stylus 35 makes a record of the load and upon referring to Fig. 5, we can easily trace this record. The dial sheet being in motion, the vehicle is shown at 7:30 o'clock in the morning with no load. At 7:45 o'clock a load is placed on the vehicle, indicated by the straight radial line running outwardly to the space between the circles, indicating up to 1000 pounds. The next line is also straight and indicates no change in the load for about twenty minutes, when a portion of the load was taken off, down to about four hundred pounds, and from thence the load was gradually reduced until at 8:45 A. M., when it was all removed and the vehicle reloaded again between 9:15 and 9:30 to over 1500 pounds. This line will indicate throughout the day the operation of the truck, the amount of load placed thereon and when it was increased or decreased, and the time. The marker 34 moves outwardly on the dial against the tension of a spring 45.

I also provide in connection with this dial sheet a stylus or marker for indicating the distance traveled and the speed. 36' represents a marker or stylus loosely mounted at 38'' on the end of the shaft 27. This marker has an arm 38' thereon and a link 39 is pivoted on said arm and provided with a slot 40 to receive a pin 41 mounted on a cam 42 that is carried by a shaft 43. An antifriction wheel 44 is mounted on the link 39 and is held in contact with the periphery of the cam 42 by the tension of a spring 45'. When this cam is revolved, the link 39 will be moved lengthwise to rock the arm 38' and impart an oscillating movement to the marker 36'. Gears 46 and 47 are loosely mounted on the shaft 43 and mesh with a pinion 48 that is revolved through the shaft 49 of the speedometer of the machine. Beveled gears 50 are mounted on the gears 46 and 47 and mesh with a pinion 51 on a hub 52 that is secured to the shaft 43. The movement of the gears 46 and 47 is timed through variation in the number of teeth therein to effect a partial revolution of the hub 52 and the shaft 43 with each revolution of the gears, and the distance the machine travels with each revolution of the gears being determined, it is evident the movement of the marker across the sheet will indicate the travel in miles and fractions thereof. This combined with the time consumed in this travel will enable the user to easily ascertain the speed of the machine at any given point. It will also disclose when the machine was standing still, as in this event the arm 36' will remain stationary and the movement of the disk will cause it to describe a circular line upon the chart. As the arm 36' is delicately balanced, the vibration caused by the running of the motor will cause it to work a broad or wavy line upon the chart, except at such times as when the truck is standing still with the motor at rest. This will plainly indicate whether or not the motor was allowed to run when the truck was standing still and at what time and for how long.

The marking arm 34, which records the load on the chart, will be subjected to vibration of greater or less degree as the character of the road produces greater or less shocks upon the oil in the spaces 17 and from thence to the gage springs 21. The violence of this vibration will therefore be an indication of the character of the road over which the truck is moving and by noticing the speed at this time the character of the driving will be revealed.

Referring now to Fig. 5, a line is shown running radially from the inner circle of the dial, indicating the travel of the marker 35 while a load is being placed on the truck, the slight deviation of this line from the radial line on the dial indicating the time consumed in placing the load on the truck. During the time the truck was standing still the marker 37' was following the arc of one of the circles described on the dial and indicating that the truck was standing still, and this line being regular in contrast to the heavy wavy lines, indicates that the engine was stopped while the truck was standing still. The truck having been loaded, the engine is started and the heavy line running outwardly to the periphery of the dial shows the time of travel from which the speed may be determined, and the heavy line made by the marker 35 indicates that the road was sufficiently rough to produce an up and down movement of the truck body and a corresponding vibration of the marker. At eight o'clock a portion of the load was removed, as indicated by the marker 35 approaching the center of the dial and the line made by the marker 37' indicates that the engine was stopped at this time. From this point on the load was gradually reduced until a few moments before nine o'clock it was entirely removed, the up and down movement of the empty truck body being registered by the marker 35, while the vibration due to the motion of the engine is indicated by the wavy line of the marker 37'. Between 9:15 and 9:30 another load was placed on the truck and this time the engine was apparently left running while the truck was stopped, and so on throughout the day loading and unloading of the truck is registered, together with the speed of the machine from point to point, the character of the roadway, whether the driver ran the truck too fast or not over a poor road, and to what extent the engine was left running when the truck was stationary.

With this apparatus I am able to obtain a permanent record or chart of the operation of a vehicle throughout the entire day's work. I can determine the load on the vehicle at any time of the day, the mileage made with any load, or without a load, the time the vehicle is moving or standing still, the total number of stops and their duration, the number of stops for taking on or discharging the load, the running of the motor while the truck is standing still, the speed at any time during the day, the character of the road, which may be compared with the speed to show the kind of driving.

I claim as my invention:

1. The combination, with a vehicle body, its carrying wheels and springs, of a record sheet graduated to indicate the load on said vehicle body and also graduated to indicate the miles of travel of said body and the time, marking devices mounted to make a permanent record on said sheet of the load at any point, the time consumed and the speed at any point in the travel of the vehicle, and mechanism actuated by the depression of the vehicle body and the movement of one of said carrying wheels for operating said markers for making a record on said sheet of the load, mileage and the speed of the vehicle.

2. The combination, with a vehicle body, its carrying wheels and springs, of a revolving dial sheet graduated to indicate tons and fractions thereof and the hours of the day and fractions thereof, and mounted to make a complete revolution in one day, marking devices mounted to make a permanent record on said sheet of the load on the vehicle at any point, the time of travel from one point to another and the speed of the vehicle, and mechanism actuated through the depression of the vehicle body for operating a load-marking device and through the movement of one of said carrying wheels for operating another marking device for making a record on said sheet of the load, mileage and the speed of the vehicle.

3. The combination, with a vehicle body, its carrying wheels and springs, of a graduated record dial mounted to revolve and having a series of concentric circles thereon, spaced apart, indicating tons and parts thereof, and radial lines representing hours of the day and fractions, independent markers mounted to travel on said dial, one marker having a radial movement from the center outwardly and inwardly as the dial revolves, and an operating mechanism connecting it with the vehicle body to be actuated through the depression thereof, said second marker also having a radial movement adjacent the periphery of said record dial and means for operating it from one of the carrying wheels, whereby as said dial is revolved, a permanent record will be made thereon of the load on the vehicle at any time of the day, the speed of the vehicle, and the miles traveled.

4. The combination, with a vehicle body, its carrying wheels and springs, of a revolving record sheet graduated to indicate the load on said vehicle body, a marking device mounted to make a permanent record on said sheet of the load at any point and mechanism connected with all four corners of the vehicle body for actuating said marking device through the depression of all of said corners or any of them.

5. The combination, with a vehicle body, its carrying wheels and springs, of a record sheet graduated to indicate the load on said vehicle body, a marking device mounted to make a permanent record on said sheet of the load at any point, a series of transmission gears for said marking device, actuating arms for said gears, a series of Bourdon coils connected with said arms and pipes containing an inelastic fluid communicating with said coils and means mounted on the four corners of the vehicle and connected with said pipes for compressing said fluid under the load on any part of said vehicle.

6. The combination, with a vehicle body, its carrying wheels and springs, of a revolving dial sheet graduated to indicate the load on said vehicle body in tons and fractions thereof, said dial also having radial lines thereon indicating hours and fractions thereof, a marker mounted to move radially on said dial, means actuated through the depression of the vehicle body under load for operating said marker, the line of said marker running outwardly on said dial as the load is placed on the vehicle, the variation of such line from a true radius indicating the time consumed in placing said load on the vehicle or removing it.

7. The combination, with a vehicle body, its carrying wheels and springs, of a revolving dial sheet divided by radial lines to indicate hours of the day and fractions thereof, a marker mounted to move radially on such sheet, an actuating mechanism for said marker operated through one of the vehicle wheels, the line made by said marker on said sheet indicating when the vehicle was running and when it was standing still, the speed, and whether the motor was running when the vehicle was standing or not.

In witness whereof, I have hereunto set my hand this 15th day of June, 1917.

CHARLES B. GAMBLE.